United States Patent Office 3,523,115
Patented Aug. 4, 1970

3,523,115
REACTIVE MONOAZO DYES
Philippe Grandjean, Basel, Switzerland, assignor to Sandoz Ltd. (also known as Sandoz A.G.), Basel, Switzerland
No Drawing. Filed Mar. 13, 1967, Ser. No. 622,454
Claims priority, application Switzerland, Mar. 28, 1966, 4,447/66
Int. Cl. C09b 29/30; D06p 1/02
U.S. Cl. 260—153          6 Claims ABSTRACT OF THE DISCLOSURE
Reactive dyes of the formula

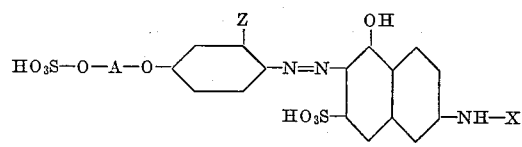

wherein
A is a lower alkylene or a lower hydroxyalkylene radical,
Z is hydrogen, chlorine, bromine, lower alkyl or —COOH, and
X is a reactive radical.

DESCRIPTION

This invention relates to valuable reactive dyes of the formula

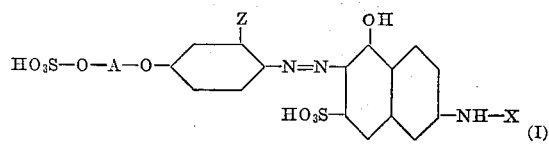

wherein
A stands for an alkylene radical which has 2 or 3 carbon atoms and may bear a hydroxyl group,
X for a radical containing at least one substituent cleavable as an anion and/or a multiple linkage capable of addition, and
Z for hydrogen, chlorine, bromine, lower alkyl or —COOH.

The process for the production of these new reactive dyes consists in reacting 1 mole of 2-amino-5-hydroxy-napthalene-7-sulfonic acid with at least 1 mole of an acylating agent containing at least one substituent cleavable as an anion and/or a multiple linkage capable of addition or of a dihalogeno- or trihalogeno-1,3,5-triazine or of a tri- or tetrahalogeno-pyrimidin, and coupling in ortho-position to the hydroxyl group with 1 mole of the diazo compoeund of an amine of formula

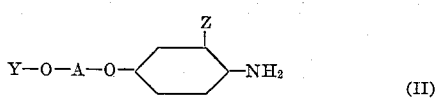

where Y stands for hydrogen or —SO₃H, followed by treatment with a sulfating agent when Y stands for hydrogen, the aforesaid reaction and coupling being carried out in either order.

A second mode of operation of this process consists in coupling 1 mole of the diazo compound of an amine of Formula II with 1 mole of 2-acylamino-5-hydroxynaphthalene-7-sulfonic acid, splitting off the acyl group and reacting the amino group with at least 1 mole of an acylating agent containing at least one substituent cleavable as an anion and/or a multiple linkage capable of addition or of a dihalogeno- or trihalogeno-1,3,5,-triazine or of a trihalogeno- or tetrahologenopyrimidine, and, when Y stands for hydrogen, treating the dye with a sulfating agent at any desired stage in the replacement of the acyl group by the radical X.

Examples of suitable groups Y—O—A in which Y stands for hydrogen are

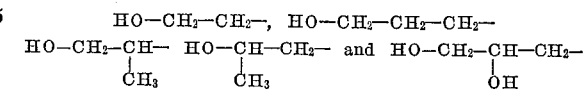

In the first mode of operation of the process the procedure may be, for example, as follows:

(a) the coupling component is reacted with the reactive component, then the coupling reaction is effected and, when Y stands for hydrogen, the resulting dye sulfated; or
(b) the coupling reaction is carried out, then the reactive radical X is introduced and, when Y stands for hydrogen, the dye sulfated either before or after the introduction of the reactive radical X.

The second mode of operation of the process also admits of several alternative procedures. For example, when Y stands for hydrogen, it may take these forms:

(a) the coupling reaction is performed, the acyl group split off, the amino group reacted with the reactive component and the dye sulfated; or
(b) the coupling reaction is carried out, the acyl group split off, the dye sulfated and the amino group reacted with the reactive component; or
(c) the coupling reaction is carried out, the dye sulfated, the acyl group split off and the amino group reacted with the reactive component; or, when Y stands for the —SO₃ group,
(d) the coupling reaction is performed, the acyl group split off and the amino group reacted with the reactive component.

The radical X bears at least one substituent cleavable as an anion, preferably a chlorine. or bromine atom or a sulfato group —O—SO₃H, and/or a C—C multiple linkage capable of addition, preferably an ethylene group which is bound to a carbonyl or sulfonyl group and may be substituted. This radical may be, for example, a reactive aliphatic or heterocyclic acyl radical derived from one of the following acids: chloroacetic, bromoacetic, β-chloropropionic, β - bromopropionic, acrylic, α - chloroacrylic, α-bromoacrylic, α,β-dichloro- or β,β-dichloroacrylic, α,β-dibromo- or β,β-dibromo-acrylic, γ-chlorocrotonic or γ-bromocrotonic, vinylsulfonic, β-chlorethane- or β-bromethanesulfonic, β-sulfatopropionic, β-sulfatoethane-sulfonic, 2,4-dichloro- or 2,4-dibromo-pyrimidine-5-carboxylic, 2,4-dichloro- or 2,4-dibromo-6-methyl- or -6-chloromethyl- or -6-dichloromethylpyrimidine - 5 - carboxylic, 2,3-dichloro- or 2,3-dibromoquinoxaline-6-carboxylic or -6-sulfonic or -6-carbamic acids. Alternatively, this radical may be a 4,6-dichloro- or 4,6-dibromo-1,3,5-triazinyl-2 radical or a radical of formula

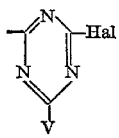

(III)

where Hal represents chlorine or bromine, and ν the radical, which may be further substituted, of a primary or secondary aliphatic, alicyclic, aromatic or heterocyclic amine, of an aliphatic or aromatic hydroxyl compound, or in particular the radical of aniline, its alkyl or sulfonic acid or carboxylic acid derivatives, the radical of lower monoalkyl or dialkyl amines, or the radical of ammonia;

or it may be a dihalogeno- or trihalogeno-pyrimidyl radical or a 2,4-dihalogenopyrimidyl-5-methylene radical. The three last-named radicals are derived from pyrimidine components, for example from 2,4,6-trichloro- or 2,4,6-tribromo-pyrimidine or their derivatives which are substituted in the 5-position, for example by methyl, carboxy, carboxymethyl, chloromethyl or bromomethyl, or from 2,4,6-trichloro-5-bromopyrimidine, 2,4,5,6-tetrachloro- or 2,4,5,6-tetrabromo-pyrimidine, 2,4-dichloro-5-chloromethylpyrimidine, 2,4-dibromo-5-bromomethylpyrimidine, 2,4-dichloro-5-chloromethyl-6-methylpyrimidine or 2,4-dibromo-5-bromomethyl-6-methylpyrimidine.

The reactive radical X can be I. lower aliphatic acyl substituted by one or two halogen atoms or a sulfato group cleavable as anion(s), e.g., (a) monohalo(lower)alkanoyl, (b) dihalo(lower)alkanoyl, (c) monohalo(lower)alkylsulfonyl, (d) sulfato(lower)alkylsulfonyl and (e) sulfato(lower)alkanoyl, and/or containing a C—C double bond, e.g. (f) (lower)alkenoyl, (g) monohalo(lower)alkenoyl, (h) dihalo(lower)alkenoyl and (i) (lower)alkenylsulfonyl; II. dihalopyrimidyl carbonyl, e.g., (a) 2,4-dihalopyrimidyl-5-carbonyl,
(b) 2,4-dihalo-6-methylpyrimidyl-5-carbonyl,
(c) 2,4-dihalo-6-halomethylpyrimidyl-5-carbonyl and
(d) 2,4-dihalo-6-dihalomethylpyrimidyl-5-carbonyl;
III. dihaloquinoxalylcarbonyl, e.g.,
2,3-dihaloquinoxalyl-6-carbonyl;
IV. dihaloquinoxalyl-sulfonyl, e.g.
2,3-dihaloquinoxalyl-6-sulfonyl;
V. dihaloquinoxalylaminocarbonyl, e.g.
2,3-dihaloquinoxalyl-6-aminocarbonyl;
VI. monohalo- or dihalo-1,3,5-triazinyl, e.g.
(a) 4,6-dihalo-1,3,5-triazinyl-2,
(b) 4-halo-6-(lower)alkoxy-1,3,5-triazinyl-2,
(c) 4-halo-6-phenoxy-1,3,5-triazinyl-2,
(d) 4-halo-6-amino-1,3,5-triazinyl-2,
(e) 4-halo-6-(lower)alkylamino-1,3,5-triazinyl-2,
(f) 4-halo-6-di(lower)alkylamino-1,3,5-triazinyl-2,
(g) 4-halo-6-hydroxy(lower)alkylamino-1,3,5-triazinyl-2,
(h) 4-halo-6-di[hydroxy(lower)alkyl]amino-1,3,5-triazinyl-2,
(i) 4-halo-6-N-(lower)alkyl-N-hydroxy(lower)alkylamino-1,3,5-triazinyl-2,
(j) 4-halo-6-(lower)alkoxy(lower)alkylamino-1,3,5-triazinyl-2,
(k) 4-halo-6-carboxy(lower)alkylamino-1,3,5-triazinyl-2,
(l) 4-halo-6-N-(lower)alkyl-N-carboxy(lower)alkylamino-1,3,5-triazinyl-2,
(m) 4-halo-6-sulfo(lower)alkylamino-1,3,5-triazinyl-2,
(n) 4-halo-6-N-(lower)alkyl-N-sulfo(lower)alkylamino-1,3,5-triazinyl-2,
(o) 4-halo-6-phenylamino-1,3,5-triazinyl-2,
(p) 4-halo-6-methylphenylamino-1,3,5-triazinyl-2,
(q) 4-halo-6-N-(lower)alkyl-N-phenylamino-1,3,5-triazinyl-2,
(r) 4-halo-6-N-hydroxy(lower)alkyl-N-phenylamino-1,3,5-triazinyl-2,
(s) 4-halo-6-carboxyphenylamino-1,3,5-triazinyl-2,
(t) 4-halo-6-sulfophenylamino-1,3,5-triazinyl-2,
(u) 4-halo-6-dicarboxyphenylamino-1,3,5-triazinyl-2,
(v) 4-halo-6-carboxysulfophenylamino-1,3,5-triazinyl-2,
(w) 4-halo-6-disulfophenylamino-1,3,5-triazinyl-2
(x) 4-halo-6-sulfonaphthylamino-1,3,5-triazinyl-2 and
(y) 4-halo-6-disulfonaphthylamino-1,3,5-triazinyl-2;
or VII. di- or trihalopyrimidyl, e.g.,
(a) 2,4-dihalo-6-methylpyrimidyl-5-methylene,
(b) 2,4-dihalopyrimidyl-5-methylene,
(c) dihalopyrimidyl,
(d) trihalopyrimidyl,
(e) 5-(lower)alkyl-dihalopyrimidyl,
(f) 5-(lower)alkoxycarbonyl-dihalopyrimidyl,
(g) 5-carboxy-dihalopyrimidyl,
(h) 5-halomethyl-dihalopyrimidyl and
(i) 5-carboxymethyl-dihalopyrimidyl;

halo in each instant being either chloro or bromo.

Normally, the introduction of the reactive aliphatic acyl radicals can be effected most easily by using the corresponding acid halides or in some cases the acid anhydrides. It is preferably to work at low temperatures, for example at 0° to 20° C., in the presence of acid-binding agents, such as sodium carbonate, sodium hydroxide, calcium hydroxide or sodium acetate, and in a weakly acid, neutral or weakly alkaline medium, for example in the pH-range of 4 to 9. For the purpose of acylation the carboxylic acid chlorides can be employed as they are or in solution in two to five times their amount of benzene, chlorobenzene, methylbenzene, dimethylbenzene or acetone, and they are added dropwise to the aqueous, well buffered solution of the compound bearing the amino group at a temperature of, e.g., 2–5° C. Acylation with the anhydrides can be carried out in the same manner.

For the introduction of the reactive heterocyclic acyl radicals: 2,4 - dichloro- or 2,4-dibromo-pyrimidyl-5-carbonyl or the 2,3-dichloro- or 2,3-dibromo-quinoxalyl-6-carbonyl or -6-sulfonyl radicals, it is convenient to use the acid halides or preferably the acid chlorides. The acid halides can be employed as they are or in solution in an organic solvent, such as dioxan, acetone, benzene, toluene or chlorobenzene, and the reaction can be conducted in the temperature range of 0° to about 60° C., preferably at 0–25° C. for the 2,4-dichloro- or 2,4-dibromo-pyrimidine-5-carboxylic acid halides or 20–55° C. for the 2,3-dichloro- or 2,3 - dibromo-quinoxaline-6-carboxylic acid or -6-sulfonic acid halides, and at a pH value of 3 to 8 or preferably, 4 to 7.

The reaction with the 2,3-dichloro- or 2,3-dibromo-quinoxaline-6-isocyanates can be carried out in an analogous manner.

The introduction of a dihalogeno-cyanuric radical is effected most expediently in aqueous medium at about 0° C., e.g. at 0° to 10° C., and at a weakly acid reaction, e.g., at a pH value of 3 to 6. The cyanuric halide can be employed in solid form or in solution in an organic solvent, such as acetone. For the primary condensation products of a cyanuric halide it is best to choose a temperature of 30° to 60° C. and a pH value of 4 to 7, whereas for the trihalogeno- and tetrahalogeno-pyrimidines the temperature may range from 20° to 100° C. It is advisable to work with a reaction vessel fitted with a reflux condenser in view of the volatility in water vapour of certain halogenopyrimidines. By employing approximately equimolar amounts, the reaction is conducted so that only one halogen atom reacts with one exchangeable hydrogen atom of the amino group. The reaction can be carried out in a weakly alkaline, neutral or weakly acid medium, though it is preferably to remain within the pH range of 9 to 3. To neutralise the equivalent of hydrogen halide which is formed, an acid-binding agent, such as sodium acetate, is added to the solution at the beginning of the reaction or, alternatively, small portions of sodium or potassium carbonate or bicarbonate in solid pulverised form or in concentrated aqueous solution are added during the course of the reaction. Aqueous solutions of sodium or potassium hydroxide are also suitable as neutralising agents.

The addition of small amounts of a wetting or emulsifying agent to the reaction mixture can accelerate the rate of reaction.

The amine of Formula II is best diazotised by the direct method at temperatures of 0° to 15° C., or preferably at 5–10° C., and coupled at 0° to about 30° C., or preferably 5–20° C., at a pH value of about 5.5 to 9, or preferably 6–7, when the coupling component bears a reactive radical X or at pH 7–8 when the coupling component is 2-amino-5-hydroxynaphthalene-7-sulfonic acid or one of its acyl derivatives, such as acetyl, propionyl, ethoxycarbonyl or methoxycarbonyl. The alkali required for neutralisation, e.g., sodium bicarbonate, can be added before the coupling reaction in one amount or in small portions during the coupling reaction.

If a 2-acylamino-5-hydroxynaphthalene-7-sulfonic acid is used as coupling component, its acyl group must be split off after coupling. Cleavage of this group can be accomplished in mineral acid medium, e.g., in 2 to 10% hydrochloric or sulfuric acid, at 70° to 100° C., or in alkaline modium, e.g., 2 to 10% or preferably 2 to 5% sodium hydroxide or potassium hydroxide solution, at 80° C. to the boiling point of the solution or preferably at 90–95° C. Cleavage of the acyl group in the sulfated dye is carried out at 90–100° C. in alkaline medium, e.g. 2–5% sodium or potassium hydroxide solution.

Examples of suitable sulfating agents are sulfuric acid of 93–100% strength, oleum, preferably of 0–25% strength, or chlorosulfonic acid. Sulfation is carried out at 0° to 80° C., e.g., at 10° to 80° C. or preferably 20° to 50° C. when concentrated sulfuric acid is used, or at 0° to 40° C. when oleum or chlorosulfonic acid is used. After coupling or sulfation, or after the introduction of the X group, the monoazo dyes are precipitated from the aqueous solution by the addition of salt, filtered off, washed if necessary and dried.

These dyes are suitable for dyeing leather and for dyeing, padding or printing wool, silk, synthetic polyamide fibers and fibers of natural or regenerated cellulose, for example cotton, linen, hemp, viscose rayon and cuprammonium rayon, and for blends and/or other materials of these fibers. They are particularly suitable for the exhaustion dyeing of natural or regenerated cellulosic fibers.

During or after dyeing, padding or printing the goods are treated with acid-binding agents, e.g., in the cold, i.e., at 20° to 40° C., when the reactive group Y is a 4,6-dihalogeno-1,3,5-triazinyl-2-group, or preferably at elevated temperature, e.g., at 80° to 100° C. or higher, when the reactive group X is a monohalogeno-1,3,5-triazinyl-2- or polyhalogenopyrimidyl group. The normal wetting, levelling and thickening agents and other textile and leather auxiliary products can be used for dyeing, padding and printing. For wool, silk and synthetic polyamide fibers it is best to use acid-binding agents which give a pH value of 5 to 8, for example acetate or phosphate buffers, hexamethylene tetramine, or sodium carbonate or bicarbonate when acetic acid is used for dyeing. Suitable acid-binding agents for natural and regenerated cellulosic fibers are sodium carbonate and bicarbonate, sodium metasilicate, sodium hydroxide, trisodium phosphate and the analogous potassium compounds.

The dyeings and prints produced on cellulosic fibers with these dyes have very good fastness to wet tests, such as water, washing at 95° C., perspiration, soda boiling and alkaline hydrolytic influences, especially at the boil together with good fastness to rubbing, stoving, chlorinated swimming pool water and dry cleaning.

The new dyes reserve acetate, triacetate, polyvinyl chloride or acetate, polyacrylonitrile, linear aromatic polyester and polyalkylene fibers. In comparison with the next comparable reactive monoazo dyes, which in place of the radical $HO_3S$—O—A—O— bear an alkoxy radical, such as $CH_3$—O— or $C_2H_5$—O— plus a sulfonic acid group bound to the benzene nucleus (see French Pat. 1,221,621, Example 26, and French patent of addition 75,771, Example 26), the dyes of the present invention have better solubility in water and a higher degree of fixation on cellulosic fibers.

In the following examples the parts and percentages are by weight and the temperatures in degrees centigrade.

EXAMPLE 1

47.8 parts of 2-amino-5-hydroxynaphthalene - 7 - sulfonic acid are dissolved in 800 parts of water at a weakly acid reaction with the addition of 10% sodium hydroxide solution. 43.6 parts of 2,4,5,6-tetrachloropyrimidine are added and the reaction mixture is stirred for a few hours at 50–60°, its pH being maintained at 4.0 to 4.5 during this time by dropwise addition of dilute sodium carbonate solution. On completion of the reaction the resulting sodium 2 - trichloropyrimidylamino - 5 - hydroxynaphthalene-7-sulfonate is completely precipitated by the addition of sodium chloride and is suctioned off, washed with dilute sodium chloride solution and dried.

In the meantime 23.3 parts of the acidic sulfuric acid ester of 1-amino-4-(2″-hydroxyethoxy)-benzene are dissolved in 400 parts of water at room temperature with the addition of 4 parts of sodium hydroxide. To this solution are added 6.9 parts of sodium nitrite. The solution is added dropwise to a mixture of 25 parts of 30% hydrochloric acid and 50 parts of ice and the suspension thus formed is stirred further at 5–10° until diazotisation is complete.

42.3 parts of sodium 2-trichloropyrimidylamino-5-hydroxynaphthalene-7-sulfonate are stirred into 600 parts of water at room temperature. The mixture is raised to 60–70° and held at this temperature until everything goes into solution. The resulting solution is cooled to 20° and in the course of 30 minutes the diazo suspension is run into it in a fine jet. At the same time 20% sodium carbonate solution is dropped in to maintain the pH-value constant at 6.5. On completion of coupling, the reaction mixture is raised to 70° and the monoazo dye formed is precipitated by the addition of sodium chloride, filtered off and dried. It is a red powder which dissolves in water to give scarlet solutions; it dyes cotton and regenerated cellulosic fibers in scarlet shades. The dye dissolves in water at 30° in amounts greater than 50 grams per liter and it has a high fixation yield on cellulosic fibers.

Application example 2 parts of the dye described in Example 1 are dissolved in 4000 parts of softened water at 40°. 100 parts of a mercerised and previously wetted out cotton fabric are entered into this bath, on which 110 parts of calcined sodium sulfate and 30 parts of calcined sodium carbonate are added. The bath is then raised to 100° in 30 minutes, with a further addition of 110 parts of calcined sodium sulfate after 10 minutes and 100 parts after 20 minutes. On reaching boiling temperature, a final 50 parts of calcined sodium carbonate are added and the bath is held at the boil for 1 hour. The dyed fabric is then removed, rinsed with water and dried. The scarlet dyeing obtained is fast to light and wet treatments.

The degree of fixation of the new dye is appreciably greater than that of the analogous dye containing an ethoxy group in para-position to the azo group and a sulfonic acid group in orthoposition to the azo group.

EXAMPLE 2

The diazo suspension prepared in accordance with the particulars of Example 1 is combined at 5–10° with a neutral solution of 23.9 parts of 2-amino-5-hydroxynaphthalene-7-sulfonic acid in 500 parts of water and 13.5 parts of 30% sodium hydroxide solution. The pH value is maintained at 7 to 8 by the gradual addition of sodium bicarbonate. The aminomonoazo dye formed is precipitated with sodium chloride and filtered off.

The filter cake is entered into 1000 parts of water to form a neutral solution which is run in the course of 2 hours into an ice-cold suspension of 20 parts of cyanuric chloride in 100 parts of water. The pH value is kept at 4 to 5 by adding 20% sodium carbonate solution. The suspension is stirred at 0° until no further aminomonoazo dye is present, on which it is raised to 40° and a neutral solution of 17.3 parts of 1-aminobenzene-3-sulfonic acid added to it. Stirring is continued for 4 hours, during which time the pH value is kept at about 7 by adding 20% sodium carbonate solution. On completion of this second condensation reaction the dye is salted out, filtered off, and dried. It is obtained as a dark powder which dissolves in water with a scarlet colour and dyes cotton and regenerated cellulosic fibers in scarlet shades.

EXAMPLE 3

The aminomonoazo dye formed as described in Example 2 is dissolved in 1000 parts of water, and this neutral solution is gradually added over 2 hours to a solution of 34.3 parts of sodium 4-(4',6'-dichloro-1',3',5'-triazinyl-2'-amino)-benzene-1 - sulfonate in 350 parts of water at 35–40°. The combined solution is stirred for a few hours at 35–40°, with the simultaneous addition of 20% sodium carbonate solution to maintain the pH-value at 6–7. When the reaction has run its course the dye is salted out, filtered off and dried. A dark powder is obtained which dissolves in water to give scarlet solutions; this dye gives dyeings of scarlet shade on cotton and regenerated cellulosic fibers.

EXAMPLE 4

15.3 parts of 1-amino-4-(2'-hydroxyethoxy)-benzene are dissolved at room temperature in 300 parts of water and 20 parts of 30% hydrochloric acid, and diazotised at 5–10° by the addition of 6.9 parts of sodium nitrite. The resulting diazo solution is allowed to run slowly into a neutral solution of 30.3 parts of sodium 2-acetylamino-5-hydroxynaphthalene-7-sulfonate in 500 parts of water at 5–10°, the pH value being maintained at 7–7.5 by the simultaneous addition of sodium carbonate solution. The dye thus formed is salted out and filtered off with suction. In the paste form as thus obtained it is dissolved in 600 parts of 2% sodium hydroxide solution and stirred for 2 hours at 95°, after which time it is completely deacetylated. The hot solution is filtered clear and adjusted to the pH-value of 7–8, on which the aminoazo dye is salted out, suctioned off and washed with sodium chloride solution.

The filter cake is dissolved in 1000 parts of water at 70° and 21.8 parts of 2,4,5,6-tetrachloropyrimidine are added thereto at 70–80° over a period of 2 hours. The pH value is kept at 6 to 7 by adding 20% sodium carbonate solution. When no further aminomonoazo dye is indicated, the newly formed tricholoropyrimidylamino dye is salted out with sodium sulfate, suctioned off and dried. It is gradually added over 1 hour at 5–10° to 32 parts of 100% sulfuric acid and 32 parts of 25% oleum, and when the addition is complete, the temperature is increased to 20° and the solution stirred for 2 hours at this temperature. It is then discharged on to ice in such a manner that the temperature remains at 0°–5°. The precipitated dye is filtered off and converted into the sodium salt by dissolving in dilute sodium carbonate solution and precipitation with sodium chloride. The salt is then filtered off and dried. It is obtained as a red powder which dissolves in water with a scarlet colour and gives dyeings of scarlets shade on cotton and regenerated cellulosic fibers.

EXAMPLE 5

The diazo suspension prepared in accordance with the procedure of Example 1 is run slowly at 5–10° into a neutral solution of 30.3 parts of sodium 2-acetylamino-5-hydroxynaphthalene-7-sulfonate in 500 parts of water. Sodium carbonate solution is added at the same time to maintain the pH-value at 7–7.5. The dye formed is salted out and suctioned off. In the paste form as obtained it is stirred in 600 parts of 2% sodium hydroxide solution for 2 hours at 95°, after which time deacetylation is complete. The hot solution is filtered clear and the aminoazo dye salted out, suctioned off and washed with sodium chloride solution.

The filter cake is dissolved in 1000 parts of water at 40° and the solution cooled to 0–5° to receive a solution of 16 parts of β-chloropropionic acid chloride in 25 parts of benzene, which is added over 2 hours at the latter temperature. The pH-value is held at 6 to 7 by adding 20% sodium carbonate solution. When no further aminomonoazo dye is indicated, the solution is raised to 20° and the resulting β-chloropropylamino dye salted out with sodium chloride, suctioned off and dried. It is a red powder which dissolves in water to give scarlet solutions; it gives dyeings of scarlet shade on cotton and regenerated cellulosic fibers.

EXAMPLE 6

The procedure of Example 5 is followed with the difference that a solution of 23.5 parts of 2,4-dichloropyrimidine-5-carboxylic acid chloride in 100 parts of acetone is used in place of the β-chloropropionic acid chloride solution. The dye formed is dried at 40° and is obtained as a red powder which dissolves in water with a scarlet colour and dyes cellulosic fibers in scarlet shades at temperatures as low as 20–40°.

EXAMPLE 7

The moist filter cake of the aminoazo dye produced in accordance with the particulars of Example 5 is dissolved in 1000 parts of water at 40°. To this solution 27 parts of finely pulverised 2,3-dichloroquinoxaline-6-carboxylic acid chloride are added in small portions, and stirring is continued at 40–45° until no further free amino group is indicated. During the reaction time dropwise addition of 20% sodium carbonate solution serves to keep the pH-value constant at 5–6. The dye is isolated in the way described in Example 5. It dissolves in water with a scarlet colour, and its dyeings on cellulosic fibers are of scarlet shade and have high fastness to light and wet treatments.

EXAMPLE 8

The 2,3-dichloroquinoxaline-6-carboxylic acid chloride used in Example 7 is replaced by the equivalent amount of 2,3-dichloroquinoxaline-6-sulfonic acid chloride or 2,3-dichloroquinoxaline-6-isocyanate. For the chloride a reaction temperature of 50–55° is preferable, while for the isocyanate 40–45° is the optimum; with the latter no addition of acid-binding agent is necessary. The dyes thus obtained are very similar to the dye of Example 7.

EXAMPLE 9

The diazo suspension prepared as detailed in Example 4 is combined at 5–10° with a neutral solution of 23.9 parts of 2-amino 5-hydroxynaphthalene-7-sulfonic acid in 500 parts of water and 13.5 parts of 30% sodium hydroxide solution. The pH-value is maintained at 7 to 8 by the gradual addition of sodium bicarbonate. The aminomonoazo dye formed is precipitated with sodium sulfate, suctioned off and dried. It is entered with stirring into 100 parts of 100% sulfuric acid over a period of 30 minutes at 15–20°. Stirring is continued for 2 hours at 30°, after which the solution is cooled to 0–5° and run on to ice. The precipitated dye is filtered off and after being washed with water the filter cake is stirred into 500 parts of water to form a suspension, the pH-value of which is adjusted to 6–7 with 30% sodium hydroxide solution. The suspension is then held at 70–80° until everything is dissolved, on which 18.4 parts of 2,4,6-trichloropyrimidine are added, together with sufficient 20% sodium carbonate solution to keep the pH-value at 6–7. When the starting aminomonoazo dye is no longer indicated, the resulting dichloropyrimidylamino dye is salted out with sodium chloride, filtered off and dried. It is obtained as a red powder which dissolves in water to give scarlet solutions and dyes cotton and regenerated cellulosic fibers in scarlet shades.

EXAMPLE 10

The acetylamino dye obtained according to the procedure of Example 4 is produced as in that example, isolated and dried. It is added over 30 minutes to 50 parts of 100% sulfuric acid and 11.7 parts of chlorosulfonic acid at 0–5°, following which the temperature is increased slowly to room temperature and the resulting solution run on to ice. The precipitated dye is filtered off and washed with water. The dye paste is entered into 800 parts of 3% sodium hydroxide solution and stirred for 2 hours at 95°, after which time deacetylation is complete. The hot solution is filtered clear and adjusted to the pH-value of 7–8 with hydrochloric acid, after which the aminoazo dye is salted out, suctioned off and washed with sodium chloride solution. The filter cake is dissolved in 1000 parts of water at room temperature, and over a period of 1 hour this solution is run with stirring into an ice-cold aqueous suspension of 18.4 parts of cyanuric chloride, with simultaneous dropwise addition of dilute sodium hydroxide solution to maintain the pH-value at 5–6. On completion of the reaction, the dichlorotriazinyl dye formed is salted out, filtered off and vacuum dried at 30–40°. Applied to cotton or regenerated cellulosic fibers by the method described below, it gives scarlet dyeings.

Application examples 2 parts of the dye of Example 10 are dissolved in 3000 parts of softened water at 40°. Into this bath 100 parts of a previously wetted out cotton or viscose rayon staple fabric are entered, and over the next 30 minutes the bath is raised to 60° with the gradual addition of 100 parts of calcined sodium sulfate. Subsequently 6 parts of sodium hydrogen carbonate are added and the bath held at 60° for a further 30 minutes. Then 6 parts of calcined sodium carbonate are added in portions over 10 minutes and the bath is maintained at the same temperature for a further 15 minutes. The dyed fabric is then removed, rinsed with hot water, soaped with a boiling 0.3% solution of a nonionic detergent, rinsed again and dried. A scarlet dyeing which is fast to light and wet tests is obtained.

EXAMPLE 11

The solution of the dichlorotriazinyl dye obtained as described in Example 10 is added to 20 parts of a 25% aqueous ammonia solution and stirred for 2 hours at 40°. On completion the monochlorotriazinyl dye formed is salted out, filtered off and dried. It dyes cotton and regenerated cellulosic fibers by the method described in Example 1 in scarlet shades.

The following table contains details of further dyes which can be produced in accordance with the particulars given in Examples 1 to 11; they are distinguished in columns (I) to (V) of the table, respectively, by the alkylene radical A, the substituent Z, the reactive component on which the radical X is based, the mode of production according to one of the Examples 1 to 11, and the shade of the dyeings on cellulosic or polyamide fibers.

TABLE

| Example Number | Radical A (I) | Substituent Z (II) | Reactive Component (III) | Procedure as in Example (IV) | Shade (V) |
|---|---|---|---|---|---|
| 12 | —CH$_2$—CH$_2$— | H | 2,4,6-trichloropyrimidine | 1 | Scarlet. |
| 13 | —CH$_2$—CH$_2$— | H | 2,4,6-tribromopyrimidine | 1 | Do. |
| 14 | —CH$_2$—CH$_2$— | H | 2,4,5,6-tetrabromopyrimidine | 1 | Do. |
| 15 | —CH$_2$—CH$_2$— | H | 2,4,6-trichloro-5-methylpyrimidine | 1 | Do. |
| 16 | —CH$_2$—CH$_2$— | H | 2,4,6-trichloro-5-bromopyridine | 1 | Do. |
| 17 | —CH$_2$—CH$_2$— | H | 2,4,6-trichloro-5-chloromethylpyrimidine | 1 | Do. |
| 18 | —CH$_2$—CH$_2$— | H | 2,4,6-trichloro-5-carboxypyrimidine | 1 | Do. |
| 19 | —CH$_2$—CH$_2$— | H | 2,4,6-trichloro-5-carboxymethylpyrimidine | 1 | Do. |
| 20 | —CH$_2$—CH$_2$—CH$_2$— | H | 2,4,5,6-tetrachloropyrimidine | 4 | Do. |
| 21 | —CH$_2$—CH(CH$_3$)— | H | 2,4,5,6-tetrachloropyrimidine | 4 | Do. |
| 22 | —CH$_2$—CH$_2$— | Cl | ...do... | 4 | Do. |
| 23 | —CH$_2$—CH$_2$— | Br | ...do... | 4 | Do. |
| 24 | —CH$_2$—CH$_2$— | —CH$_3$ | ...do... | 4 | Do. |
| 25 | —CH$_2$—CH$_2$— | —C$_2$H$_5$ | ...do... | 4 | Do. |
| 26 | —CH$_2$—CH$_2$— | —COOH | ...do... | 4 | Do. |
| 27 | —CH$_2$—CH$_2$— | H | 2,4-dichloro-5-chloromethyl-6-methylpyrimidine | 1 | Do. |
| 28 | —CH$_2$—CH$_2$—CH$_2$— | H | 2,4,6-trichloro-5-bromopyrimidine | 1 | Do. |
| 29 | —CH$_2$—CH$_2$— | H | chloroacetic acid chloride | 5 | Do. |
| 30 | —CH$_2$—CH$_2$— | H | α-chloroacrylic acid chloride | 5 | Do. |
| 31 | —CH$_2$—CH$_2$— | H | cyanuric chloride, than β-hydroxyethylamine | 2 | Do. |
| 32 | —CH$_2$—CH$_2$— | H | cyanuric chloride, then methylamine | 2 | Do. |
| 33 | —CH$_2$—CH$_2$— | H | 2,4-dichloro-6-(2′-carboxyphenylamino)-1,3,5-triazine | 3 | Do. |
| 34 | —CH$_2$—CH$_2$— | H | bromoacetic acid bromide | 5 | Do. |
| 35 | —CH$_2$—CH$_2$— | H | acrylic acid chloride | 5 | Do. |
| 36 | —CH$_2$—CH$_2$— | H | 2,4-dichloro-6-(2′-sulfoethylamino)-1,3,5-triazine | 3 | Do. |
| 37 | —CH$_2$—CH$_2$— | H | cyanuric bromide | 10 | Do. |
| 38 | —CH$_2$—CH$_2$— | H | β-bromopropionic acid chloride | 5 | Do. |
| 39 | —CH$_2$—CH$_2$— | H | 2,4-dichloro-6-methylpyrimidine-5-carboxylic acid chloride | 6 | Do. |
| 40 | —CH$_2$—CH$_2$— | H | 2,4-dichloro-6-carboxymethylamino-1,3,5-trizine | 3 | Do. |
| 41 | —CH$_2$—CH$_2$— | H | cyanuric chloride, then di-(β-hydroxypropyl)-amine | 11 | Do. |
| 42 | —CH$_2$—CH$_2$— | H | α-bromoacrylic acid chloride | 5 | Do. |
| 43 | —CH$_2$—CH$_2$— | H | 2,4-dibromo-5-bromomethyl-6-methylpyrimidine | 1 | Do. |
| 44 | —CH$_2$—CH$_2$— | H | 2,4-dichloro-5-chloromethylpyrimidine | 1 | Do. |
| 45 | —CH$_2$—CH$_2$— | H | α,β-dichloroacrylic acid chloride | 5 | Do. |
| 46 | —CH$_2$—CH$_2$— | H | β,β-dichloroacrylic acid chloride | 5 | Do. |
| 47 | —CH$_2$—CH$_2$— | H | γ-chlorocrotonic acid chloride | 5 | Do. |
| 48 | —CH$_2$—CH$_2$— | H | γ-bromo-crotonic acid chloride | 5 | Do. |
| 49 | —CH$_2$—CH$_2$— | H | vinylsulfonic acid chloride | 5 | Do. |
| 50 | —CH$_2$—CH$_2$— | H | 2,4-dibromopyrimidine-5-carboxylic acid chloride | 6 | Do. |
| 51 | —CH$_2$—CH$_2$— | H | 2,3-dibromoquinoxaline-6-carboxylic acid bromide | 6 | Do. |
| 52 | —CH$_2$—CH$_2$— | H | cyanuric bromide, then methylamine | 2 | Do. |
| 53 | —CH$_2$—CH$_2$— | H | cyanuric chloride, then aminobenzene | 2 | Do. |
| 54 | —CH$_2$—CH$_2$— | H | cyanuric chloride, then 4-methyl-1-aminobenzene | 2 | Do. |
| 55 | —CH$_2$—CH$_2$— | H | cyanuric chloride, then N-methyl-aminobenzene | 2 | Do. |
| 56 | —CH$_2$—CH$_2$— | H | cyanuric chloride, then N-β-hydroxyethylaminobenzene | 2 | Do. |
| 57 | —CH$_2$—CH(CH$_3$)— | H | 2,4-dichloro-6-di-(β-hydroxyethyl)-amino-1,3,5-triazine | 3 | Do. |

TABLE

| Example Number | Radical A (I) | Substituent Z (II) | Reactive Component (III) | Procedure as in Example (IV) | Shade (V) |
|---|---|---|---|---|---|
| 58 | —CH₂—CH—<br>  \|<br>  CH₃ | H | β-chloropropionic acid chloride | 5 | Scarlet. |
| 59 | —CH₂—CH₂— | H | cyanuric chloride, then 3-methoxypropylamine | 2 | Do. |
| 60 | —CH₂—CH₂— | H | 2,4-dichloro-6-(2',4'-disulfophenylamino)-1,3,5-triazine | 3 | Do. |
| 61 | —CH₂—CH₂— | H | 2,4-dichloro-6-(β-carboxyethylamino)-1,3,5-trizine | 3 | Do. |
| 62 | —CH₂—CH₂— | H | 2,4-dichloro-6-(4'-sulfonaphthyl-1'-amino)-1,3,5-triazine | 3 | Do. |
| 63 | —CH₂—CH₂— | H | 2,4-dichloro-6-(6'-sulfonaphthyl-2'-amino)1,3,5-triazine | 3 | Do. |
| 64 | —CH₂—CH₂— | H | 2,4-dichloro-6-(N-ethyl-N-β-carboxyethylamino)-1,3,5-triazine | 3 | Do. |
| 65 | —CH₂—CH₂— | H | cyanuric chloride, then ethylamine | 2 | Do. |
| 66 | —CH₂—CH₂— | H | cyanuric chloride, then β-ethyoxyethylamine | 2 | Do. |
| 67 | —CH₃—CH₂— | H | cyanuric chloride, then 4-carboxy-1-aminobenzene | 2 | Do. |
| 68 | —CH₂—CH₂— | H | cyanuric chloride, then 3-methox-ybutylamine | 2 | Do. |
| 69 | —CH₂—CH₂— | H | β-sulfato-ethylsulfonic acid chloride | 5 | Do. |
| 70 | —CH₂—CH₂— | H | 2,4-dichloro-6-(2'-carboxy-5'-sulfophenylamino)-1,3,5-triazine | 3 | Do. |
| 71 | —CH₂—CH₂— | H | 2,4-dichloro-6-(2',4'-dicarboxyphenylamino)-1,3,5-triazine | 3 | Do. |
| 72 | —CH₂—CH₂— | H | cyanuric chloride, then 2-methoxyethylamine | 2 | Do. |
| 73 | —CH₂—CH₂— | H | cyanuric chloride, then 3-hydroxypropylamine | 2 | Do. |
| 74 | —CH₂—CH₂— | H | 2,4-dichloro-6-phenoxy-1,3,5-triazine | 3 | Do. |
| 75 | —CH₂—CH₃— | H | 2,4-dichloro-6-methoxy-1,3,5-triazine | 3 | Do. |
| 76 | —CH₂—CH₂— | H | 2,4-dichloro-6-ethoxy-1,3,5-triazine | 3 | Do. |
| 77 | —CH₂—CH₂— | H | cyanuric chloride, then N-methyl-N-β-hydroxyethylamine | 2 | Do. |
| 78 | —CH₂—CH₂— | H | 2,4-dibromo-6-(4'-sulfophenylamino)-1,3,5-triazine | 3 | Do. |
| 79 | —CH₂—CH₂— | H | 2,4,-dichloro-6-(2',5'-dicarboxyphenylamino)-1,3,5-triazine | 3 | Do. |
| 80 | —CH₂—CH₂— | H | 2,4-dichloro-6-(N-methyl-N-β-sulfoethylamino)-1,3,5-triazine | 3 | Do. |
| 81 | —CH₂—CH₂— | H | 2,4-dichloro-6-(3',6'-disulfonaphthyl-1'-amino)-1,3,5-triazine | 3 | Do. |
| 82 | —CH₂—CH₂— | H | 2,4-dichloro-6-(4',8'-disulfonaphthyl-2'-amino)-1,3,5-triazine | 3 | Do. |
| 83 | —CH₂—CH—<br>  \|<br>  CH₃ | H | 2,4-dichloro-6-(2',5'-disulfophenylamino)-1,3,5-triazine | 3 | Do. |
| 84 | —CH₂—CH₂— | H | 2,4-dichloro-6-(2'carboxy-4'-sulfophenylamino)-1,3,5-triazine | 3 | Do. |
| 85 | —CH₂—CH₂— | H | 2,4-dichloro-6-(N-methyl-N-carboxymethylamino)-1,3,5-triazine | 3 | Do. |
| 86 | —CH₂—CH₂— | H | 2,4-dichloro-6-(4',6'-disulfonaphthyl-1'-amino)-1,3,5-triazine | 3 | Do. |
| 87 | —CH₂—CH₂— | H | α,β-dichloropropionic acid chloride | 5 | Do. |

Formulae of representative dyes of the foregoing examples are as follows:

Examples 1 and 4

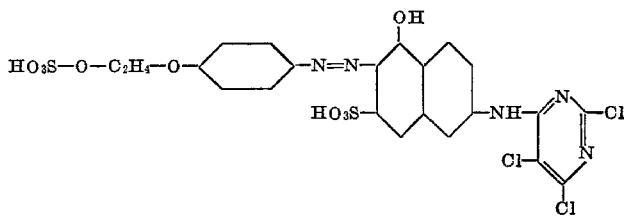

Example 2

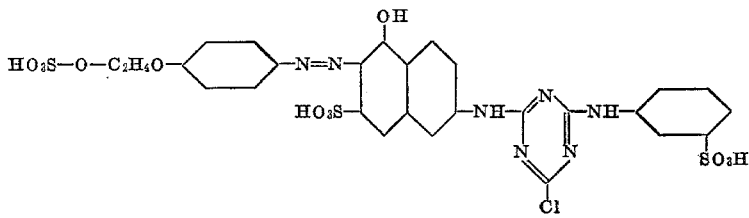

Example 3

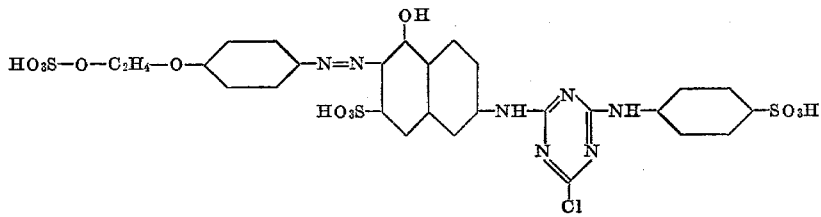

Example 5

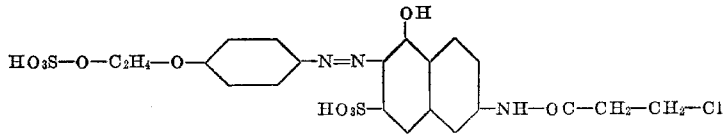

Example 6

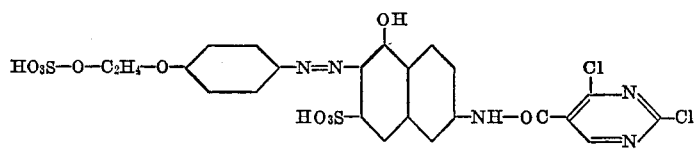

Example 7

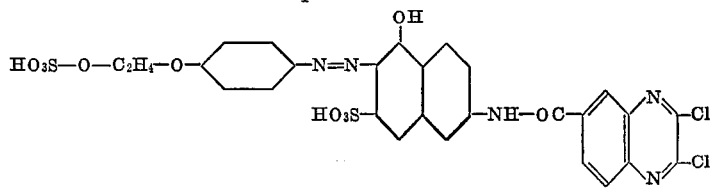

Example 8

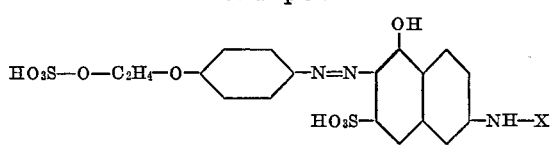

X is 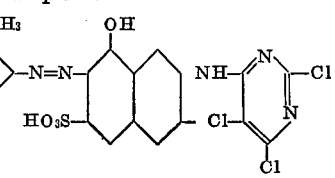

Example 9

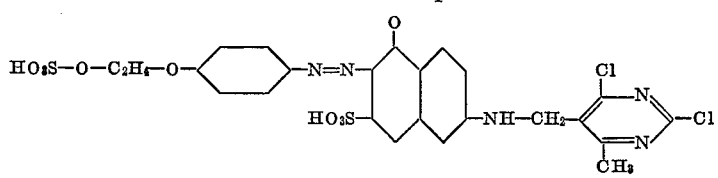

Example 10

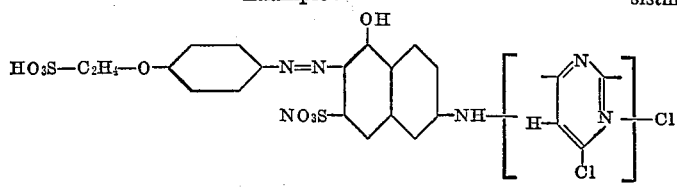

Example 11

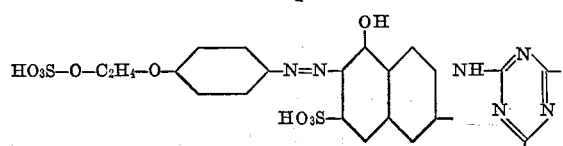

Example 22

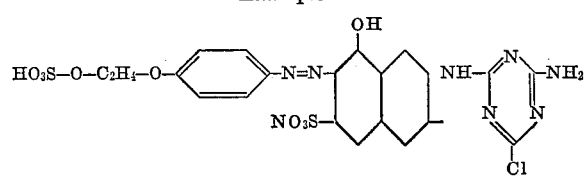

Example 24

Example 27

Having thus disclosed the invention what I claim is:

1. A reactive dye of the formula

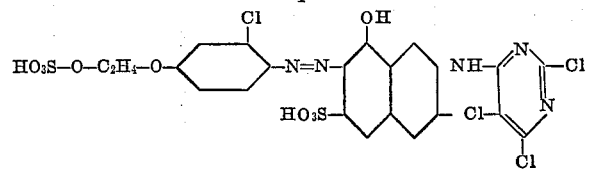

wherein A is a member selected from the group consisting of $-CH_2-CH_2-$, $-CH_2-CH_2-CH_2-$, $-CH-CH_2-$, $-CH_2-CH-$
$\qquad\qquad\qquad\qquad\qquad\qquad\quad\ \ |\qquad\qquad\ \ |$
$\qquad\qquad\qquad\qquad\qquad\qquad\ \ CH_3\qquad\ \ CH_3$ and $-CH_2-CH-CH_2-$
$\qquad\ \ |$
$\qquad OH$ X is a reactive radical selected from the group consisting of monohalo (lower) alkanoyl, dihalo (lower) alkanoyl (lower) alkenoyl, mono-halo (lower) alkenoyl, dihalo (lower) alkenoyl, mono-halo (lower) alkylsulfonyl (lower) alkenylsulfonyl, sulfato (lower) alkylsulfonyl, sulfato (lower) alkanoyl, 2,4-dihalopyrimidyl-5-carbonyl,
2,4-dihalo-6-methyl-pyrimidyl-5-carbonyl,
2,4-dihalo-6-halomethyl-pyrimidyl-5-carbonyl,
2,4-dihalo-6-dihalomethyl-pyrimidyl-5-carbonyl,
2,3-dihaloquinoxalyl-6-carbonyl-,
2,3-dihaloquinoxalyl-6-sulfonyl,
2,3-dihaloquinoxalyl-6-aminocarbonyl;
4,6-dihalo-1,3,5-triazinyl-2-,
4-halo-6-(lower)alkoxy-1,3,5-triazinyl-2,
4-halo-6-phenoxy-1,3,5-triazinyl-2-,
4-halo-6-amino-1,3,5-triazinyl-2, 4-halo-6-(lower)alkylamino-1,3,5-triazinyl-2,
4-halo-6-di-(lower)alkyl-amino-1,3,5-triazinyl-2,
4-halo-6-(lower)hydroxyalkyl-amino-1,3,5-triazinyl-2,
4-halo-6-di(hydroxy(lower)alkyl)-amino-1,3,5-triazinyl-2,
4-halo-6-N-(lower)alkyl-N-hydroxy(lower)alkylamino-1,3,5-triazinyl-2,
4-halo-6-(lower)alkoxy(lower)-alkylamino-1,3,5-triazinyl-2,
4-halo-6-carboxy(lower)alkylamino-1,3,5-triazinyl-2,
4-halo-6-N-(lower)alkyl-N-carboxy(lower)alkylamino-1,3,5-triazinyl-2,
4-halo-6-sulfo(lower)alkylamino-1,3,5-triazinyl-2,
4-halo-6-N-lower alkyl-N-sulfo(lower)alkylamino-1,3,5-triazinyl-2,
4-halo-6-phenylamino-1,3,5-triazinyl-2,
4-halo-6-methylphenylamino-1,3,5-triazinyl-2,
4-halo-6-N-(lower)alkyl-N-phenylamino-1,3,5-triazinyl-2,
4-halo-6-N-hydroxy(lower)alkyl-N-phenylamino-1,3,5-triazinyl-2,
4-halo-6-carboxyphenylamino-1,3,5-triazinyl-2,
4-halo-6-sulfophenyl-amino-1,3,5-triazinyl-2,
4-halo-6-dicarboxyphenylamino-1,3,5-triazinyl-2,
4-halo-6-carboxysulfophenylamino-1,3,5-triazinyl-2,
4-halo-6-disulfophenylamino-1,3,5-triazinyl-2,
4-halo-6-sulfonaphthylamino-1,3,5-triazinyl-2,
4-halo-6-disulfonaphthylamino-1,3,5-triazinyl-2,
2,4-dihalo-6-methylpyrimidyl-5-methylene,
2,4-dihalopyrimidyl-5-methylene,
dihalo-pyrimidyl,
trihalopyrimidyl,
5-lower alkyl-dihalopyrimidyl,
5-lower alkoxy-carbonyl-dihalopyrimidyl,
5-carboxy-dihalopyrimidyl,
5-halomethyl-dihalopyrimidyl,
and 5-carboxy-methyl-dihalopyrimidyl, halogen being chlorine or bromine, and Z is a member selected from the group consisting of hydrogen, chlorine, bromine, lower alkyl and —COOH.

2. The reactive dye according to claim 1 of the formula

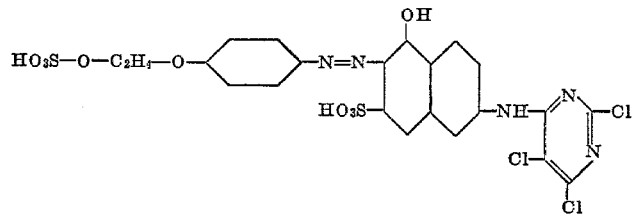

3. The reactive dye according to claim 1 of the formula

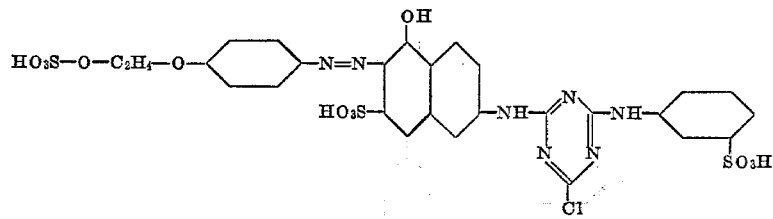

4. The reactive dye according to claim 1 of the formula

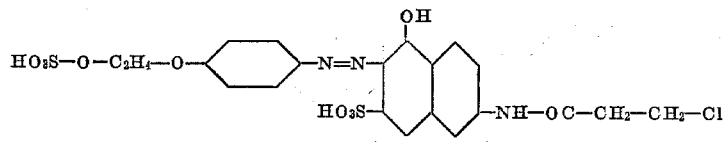

5. The reactive dye according to claim 1 of the formula

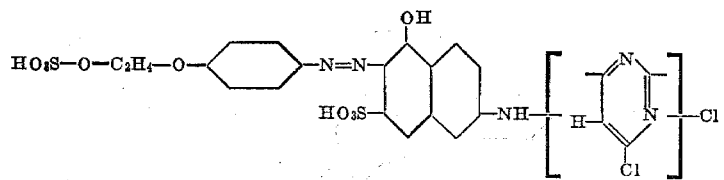

6. The reactive dye according to claim 1 of the formula
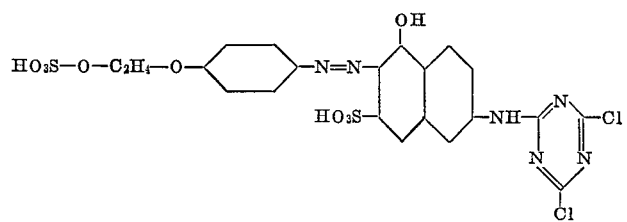
References Cited
FOREIGN PATENTS
1,252,324  12/1960  France.
CHARLES B. PARKER, Primary Examiner
D. M. PAPUGA, Assistant Examiner
U.S. Cl. X.R.
260—154, 198, 199; 8—13, 42, 51, 55, 542

UNITED STATES PATENT OFFICE
CERTIFICATE OF CORRECTION

Patent No. 3,523,115            Dated August 4, 1970

Inventor(s) Philippe Grandjean

It is certified that error appears in the above-identified patent and that said Letters Patent are hereby corrected as shown below:

In column 1, line 53, "-pyrimidin" should be --pyrimidine--. In column 2, line 8, "5,-triazine" should be --5-triazine--; line 15, "$HO-CH_2-CH_2-CH_2-$" should be --$HO-CH_2-CH_2-CH_2-$,--; line 16, "$HO-CH_2-CH-$" should be --$HO-CH_2-CH-$,--; (with $CH_3$ substituent)

line 42, "$-SO_3$" should be --$SO_3H$--. In column 4, line 7, "triazinyl-2" should be --triazinyl-2,--; line 52, "preferably," should be --preferably--; line 73, "preferably" should be --preferable--. In column 5, line 27, "modium" should be --medium--. In column 6, line 65, "apprecially" should be --appreciably--; line 68, "orthoposition" should be --ortho-position--. In column 7, line 60, "tricholoropyrimidylamino" should be --trichloropyrimidylamino--; line 74, "scarlets" should be --scarlet--. In column 8, line 22, "chloropropylamino" should be --chloropropionylamino--; line 65, "amino 5-" should be --amino-5- --. In columns 9/10, in the table, Example No. 16, "pyridine" should be --pyrimidine--; Example No. 40, "trizine" should be -- -triazine--. In column 12, in the table, Example No. 61, "-trizine" should be -- -triazine--; Example No. 63, "amino)1," should be --amino)-1,--; Example No. 66, "ethyoxyethylamine" should be --ethoxyethylamine--; Example No. 68, "methox-ybutylamine" should be --methoxy-butylamine--; Example No. 78, "trizaine" should be --triazine--; Example No. 84, (2'carboxy" should be --(2'-carboxy--. In column 13, in the structure of Example 9,

FORM PO-1050 (10-69)

UNITED STATES PATENT OFFICE
CERTIFICATE OF CORRECTION

Patent No. 3,523,115        Dated August 4, 1970

Inventor(s) Philippe Grandjean        PAGE - 2

It is certified that error appears in the above-identified patent and that said Letters Patent are hereby corrected as shown below:

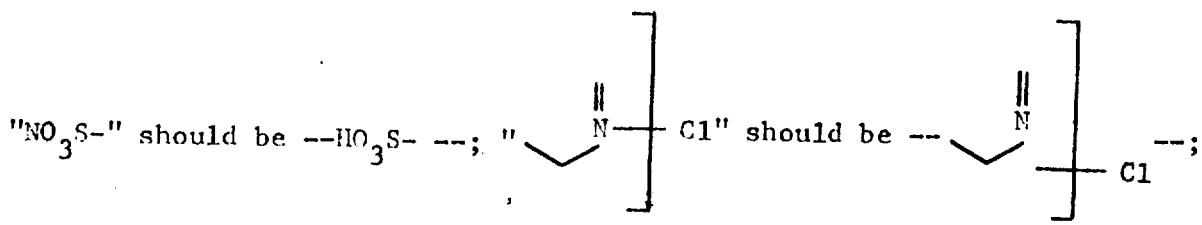

"$NO_3S-$" should be --$HO_3S-$--; " ... Cl" should be -- ... --;

in the structures of Examples 10, and 11, respectively,

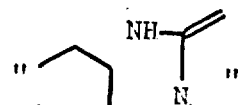

should be -- ... --; in the structure of Example 11, " ⬡ "

should be -- ⬡ --; "$NO_3S$" should be --$HO_3S$--. In column 14, in the structure of Example 24,  should be -- ... --; in the structure of Example 27, " O " should be -- OH --. In column 13, in the structure of Example 22, " ... " should be -- ... --. In column 14,

FORM PO-1050 (10-69)

USCOMM-DC 60376-P69

UNITED STATES PATENT OFFICE
CERTIFICATE OF CORRECTION

Patent No. 3,523,115         Dated August 4, 1970

Inventor(s) Philippe Grandjean         PAGE - 3

It is certified that error appears in the above-identified patent and that said Letters Patent are hereby corrected as shown below:

line 60, "kanoyl" should be --kanoyl,--; line 62, "fonyl" should be --fonyl,--; "sulfato" should be --sulfato- --; line 74, "triazinyl-2-," should be --triazinyl-2,--. In column 16, in the structure of claim 5, "  "

should be -- 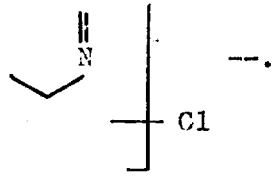 --.

Signed and sealed this 30th day of May 1972.

(SEAL)
Attest:

EDWARD M. FLETCHER, JR.　　　　　　　ROBERT GOTTSCHALK
Attesting Officer　　　　　　　　　　　Commissioner of Patents